(12) United States Patent
Cacciabeve

(10) Patent No.: US 10,247,388 B2
(45) Date of Patent: Apr. 2, 2019

(54) PORTABLE LIGHT

(71) Applicant: Walter R. Tucker Enterprises, Ltd., Deposit, NY (US)

(72) Inventor: Robert Cacciabeve, Boonton, NJ (US)

(73) Assignee: Walter R. Tucker Enterprises, Ltd., Deposit, NY (US)

( * ) Notice: Subject to any disclaimer, the term of this patent is extended or adjusted under 35 U.S.C. 154(b) by 0 days.

(21) Appl. No.: 15/921,798

(22) Filed: Mar. 15, 2018

(65) Prior Publication Data

US 2018/0202631 A1 Jul. 19, 2018

Related U.S. Application Data

(63) Continuation of application No. 15/156,988, filed on May 17, 2016, now Pat. No. 9,951,930, which is a continuation of application No. 29/542,750, filed on Oct. 16, 2015.

(60) Provisional application No. 62/269,314, filed on Dec. 18, 2015.

(51) Int. Cl.
| | |
|---|---|
| *F21V 3/00* | (2015.01) |
| *F21V 15/04* | (2006.01) |
| *F21V 15/01* | (2006.01) |
| *H02J 7/00* | (2006.01) |
| *F21V 23/04* | (2006.01) |
| *F21V 31/00* | (2006.01) |
| *F21V 5/04* | (2006.01) |
| *F21V 21/14* | (2006.01) |
| *F21S 9/02* | (2006.01) |
| *F21W 131/10* | (2006.01) |
| *F21Y 115/10* | (2016.01) |

(52) U.S. Cl.
CPC .............. *F21V 15/04* (2013.01); *F21V 15/01* (2013.01); *H02J 7/0047* (2013.01); *F21S 9/02* (2013.01); *F21V 5/04* (2013.01); *F21V 21/145* (2013.01); *F21V 23/04* (2013.01); *F21V 31/005* (2013.01); *F21W 2131/1005* (2013.01); *F21Y 2115/10* (2016.08); *H02J 2007/005* (2013.01); *H02J 2007/0049* (2013.01)

(58) Field of Classification Search
CPC ................. F21V 3/00; F21V 5/00; F21L 4/00
USPC ..... 362/311.06, 311.02, 311.01, 197, 331.02
See application file for complete search history.

(56) References Cited

U.S. PATENT DOCUMENTS

| | | |
|---|---|---|
| D217,638 S | 5/1970 | Magi |
| D316,305 S | 4/1991 | Court |
| 5,469,345 A | 11/1995 | Petersen et al. |
| 5,720,543 A | 2/1998 | Sheps |
| D438,667 S | 3/2001 | Leen |

(Continued)

OTHER PUBLICATIONS

Nikolaj Pottier, OHIM—Office for Harmonization in the Internal Market, No. 002221044-0001, entitled "Work Lamps", 5 pages.

(Continued)

*Primary Examiner* — Edwyn Labaze
(74) *Attorney, Agent, or Firm* — Breiner & Breiner, L.L.C.

(57) ABSTRACT

A portable work light is disclosed having a front cover having a LED light source; a protective housing for the LED light source; a back housing for enclosing the portable light and the various components thereof; a power source and electrical components for operating the portable light; a ratcheting stand and handle; and a plurality of bumpers for protecting various contact points of the portable light.

27 Claims, 10 Drawing Sheets

(56) References Cited

U.S. PATENT DOCUMENTS

| | | | |
|---|---|---|---|
| D441,491 S | 5/2001 | Leen | |
| D469,212 S | 1/2003 | Chiu | |
| 6,629,771 B2 | 10/2003 | Chiu | |
| D553,771 S | 10/2007 | Watson et al. | |
| D606,691 S | 12/2009 | Lindholm | |
| D608,938 S | 1/2010 | Schmitt et al. | |
| D629,561 S | 12/2010 | Kim et al. | |
| D630,374 S | 1/2011 | Leen | |
| 7,932,528 B2 | 4/2011 | Tessnow | |
| D702,865 S | 4/2014 | Yuen | |
| D706,478 S | 6/2014 | Yuen | |
| D731,988 S | 6/2015 | Urtiga et al. | |
| D732,220 S | 6/2015 | Bao | |
| D735,387 S | 7/2015 | Bao | |
| D738,022 S | 9/2015 | Shen | |
| D742,058 S | 10/2015 | Chen | |
| D744,139 S | 11/2015 | Itoh et al. | |
| D748,448 S | 2/2016 | Nelson | |
| D750,307 S | 2/2016 | Borring | |
| 2003/0039118 A1* | 2/2003 | Osiecki | F21L 4/00 362/208 |
| 2005/0265035 A1 | 12/2005 | Brass et al. | |
| 2006/0087846 A1 | 4/2006 | Yuen | |
| 2006/0109662 A1 | 5/2006 | Reiff et al. | |
| 2007/0115674 A1 | 5/2007 | Tessnow | |
| 2008/0225518 A1 | 9/2008 | Devaney et al. | |
| 2009/0122546 A1 | 5/2009 | Liu | |
| 2013/0241435 A1 | 9/2013 | Lamvik et al. | |
| 2014/0126192 A1 | 5/2014 | Ancona et al. | |
| 2014/0313706 A1 | 10/2014 | Itoh et al. | |
| 2015/0263239 A1 | 9/2015 | Watanabe | |
| 2015/0285460 A1 | 10/2015 | Langhart | |
| 2016/0010837 A1* | 1/2016 | Jigamian | F21V 21/406 362/418 |

OTHER PUBLICATIONS

Brochure: Scangrip Colour Match, Work Light of the future, Innovative Tools & Technologies, Inc., St. Paul, Minnesota, www.innovativetools.com, 4 pages.

First Colour Match in the World, Product Launch—Detailing and Color Match Lights, 2 pages.

Scangrip Lighting, 2014 Pricelist, Scangrip A/S, Svendborg, Denmark, www.scangrip.com, 9 pages.

Mateo Tools, Drive Business, 10W COB Aluminum Cordless Light, ALCOB10, Class C, www.matcotools.com, 2 pages.

YouTube Video: First Generation Scangrip Detailing and Colour Match, www.youtube.com/watch?v=Zh_aPbbTBPI, 2 pages.

Web pages, Multimatch Item No. 03.5415, www.scangrip.com/en/detailing-and-colour-match-lights/multimatch, 8 pages.

\* cited by examiner

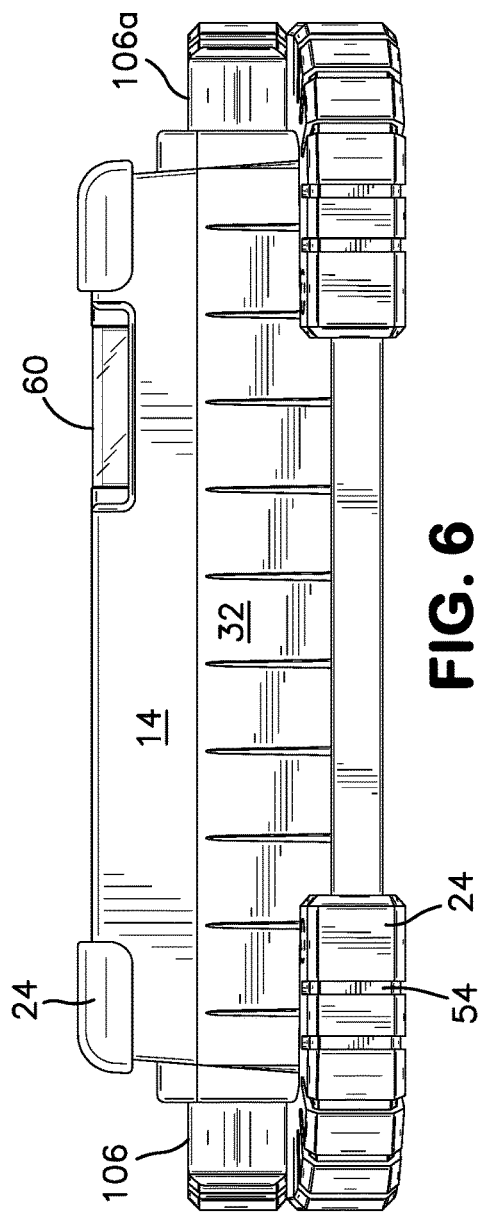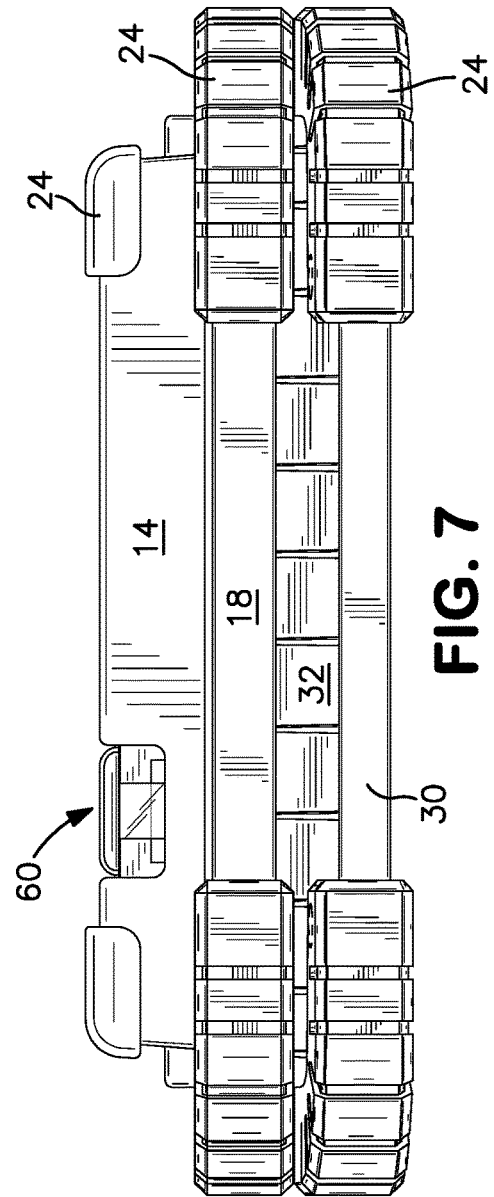

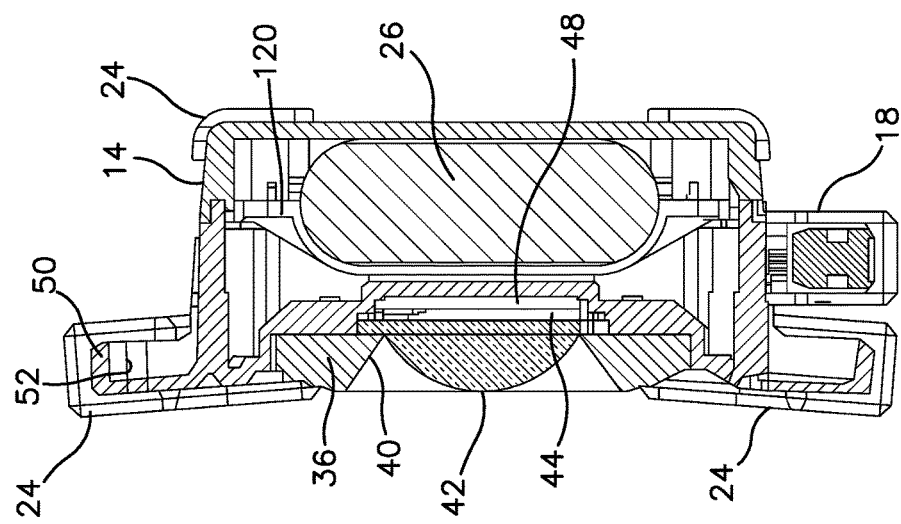
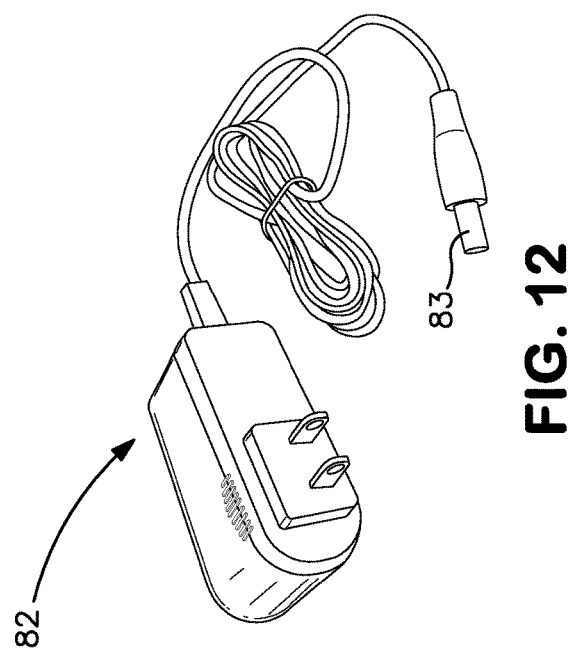

PORTABLE LIGHT

RELATED APPLICATIONS

This application claims the benefit of the following applications under 35 U.S.C. § 120: U.S. patent application Ser. No. 15/156,988, filed May 17, 2016, entitled "Portable Light;" U.S. Provisional Application Ser. No. 62/269,314, filed Dec. 18, 2015, entitled "Portable Light;" and U.S. patent application Ser. No. 29/542,750, filed Oct. 16, 2015, entitled "Portable Light." All of the aforesaid applications are incorporated herein by reference in their entirety.

FIELD OF INVENTION

The present invention relates to a portable light. More particularly, the invention relates to a portable LED work light.

BACKGROUND OF INVENTION

Portable lights are known for use in various work situations, including working on an automobile and working in the home. In such instances, there is not an adequate amount of light, e.g. working on a car in a garage or working on a sink in the home; and a portable light source is required to illuminate the work area; be easy to move about; direct the light source to the specific zones of the work area; be sturdy to avoid damage; be adjustable to move the light to different zones of the work area; and/or being capable of absorbing contact in the event the portable light falls or is dropped.

Various types of work lights are known in the art. While these devices may provide one or more of the desired attributes, including as set forth above, these devices have various shortcomings and may not meet the various attributes required for a portable work light. These and other shortcomings of the known portable work lights are addressed by the present invention.

SUMMARY OF INVENTION

A primary object of the present invention is to provide a portable work light.

Another primary object of the present invention is to provide a portable LED work light capable of providing sufficient illumination to the work area and adapted to be adjusted to different positions for illuminating the work area.

Another primary object of the present invention is to provide a portable LED work light including a plurality of bumpers for protecting the different contact areas of the work light.

Another primary object of the present invention is to provide a new and unique protective housing for the LED light source.

Another primary object of the present invention is to provide a new and unique combination stand and handle which ratchets and may be placed in a plurality of different positions.

The portable work light of the invention comprises a front cover having a LED light source; a protective housing for the LED light source; a back housing for enclosing the portable light and the various components thereof; a power source and electrical components for operating the portable light; a ratcheting stand and handle; and a plurality of bumpers for protecting certain of the contact points of the portable light.

The protective housing for the LED light source includes an outer annular housing having a recess for receiving a lens, preferably a beveled lens, to cover and protect the LED light source.

The ratcheting stand and handle allows the portable light to be stood in a plurality of different positions providing the stand functionality or ratcheting to a 180 degree angle position for carrying or hanging the portable light.

The plurality of bumpers are preferably attached at certain of the contact points of the portable light, thereby protecting these contact points in the event that the light is dropped, falls or is knocked over.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 6 is a top view of the light.

FIG. 7 is a bottom view of the light.

FIG. 11 is a cross-section of one embodiment of the portable work light.

FIG. 12 is a perspective view of the charger for the portable light.

DETAILED DESCRIPTION OF THE PREFERRED EMBODIMENTS

Figure 1:
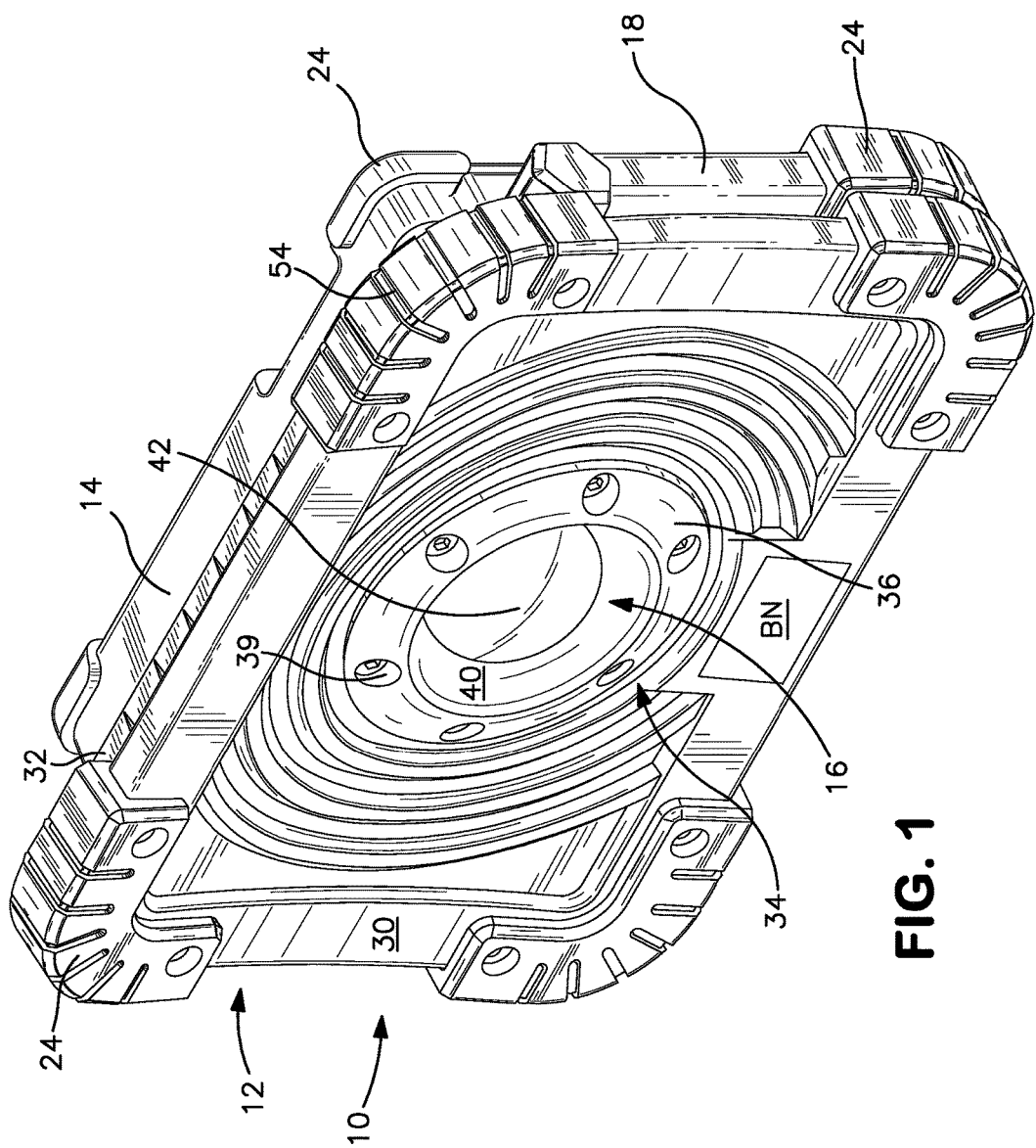
FIG. 1 is a front/side elevational perspective view of the portable light.
Figure 2:
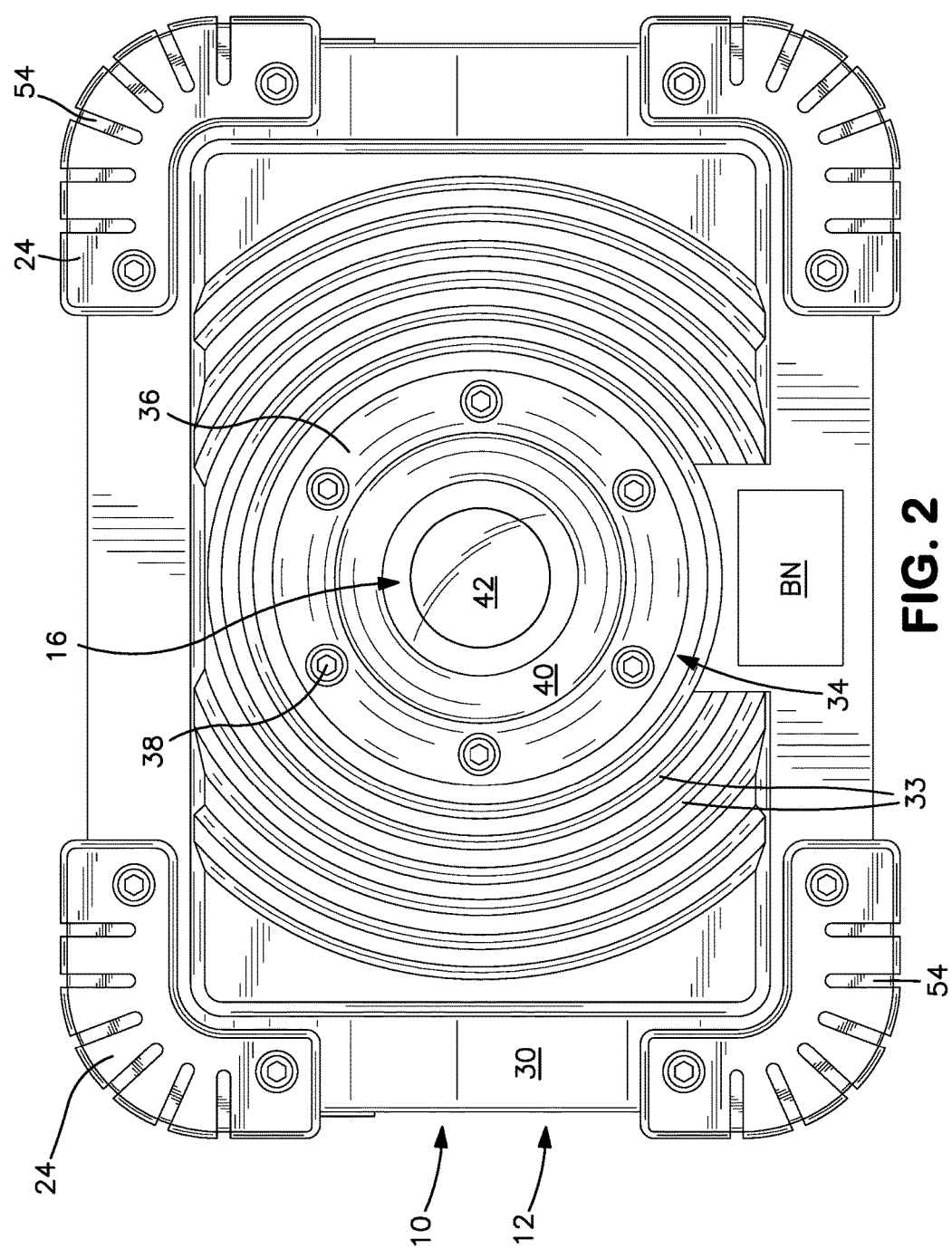
FIG. 2 is a front view of the light.

The present invention is directed to a portable light. More specifically, the present invention is directed to a portable LED work light capable of providing the necessary illumination to a work area such as an automotive garage or a work area in the home. The portable light of the present invention includes a ratchet stand and handle for positioning the light at various positions to focus the light on a specific zone of the work area or to carry the light or hang the light. The portable work light further includes a plurality of bumpers for protecting the multiple contact points of the light to provide for a sturdy work light and a work light subject to the rigors of being used in an automotive garage or similar work area. The portable work light further includes a light source housing capable of providing illumination and protecting the light source. These and other various aspects of the present invention will become apparent from the detailed description of the invention.

The invention is directed to a portable light 10. The portable light 10 includes a front cover 12, a back housing 14, a light source 16, a ratchet stand and handle 18, a power switch 20, a plurality of electrical ports 22, a plurality of bumpers 24, a power source 26 and an electrical PLC board 28. Various aspects of the invention will now be described in further detail.

Figure 3:
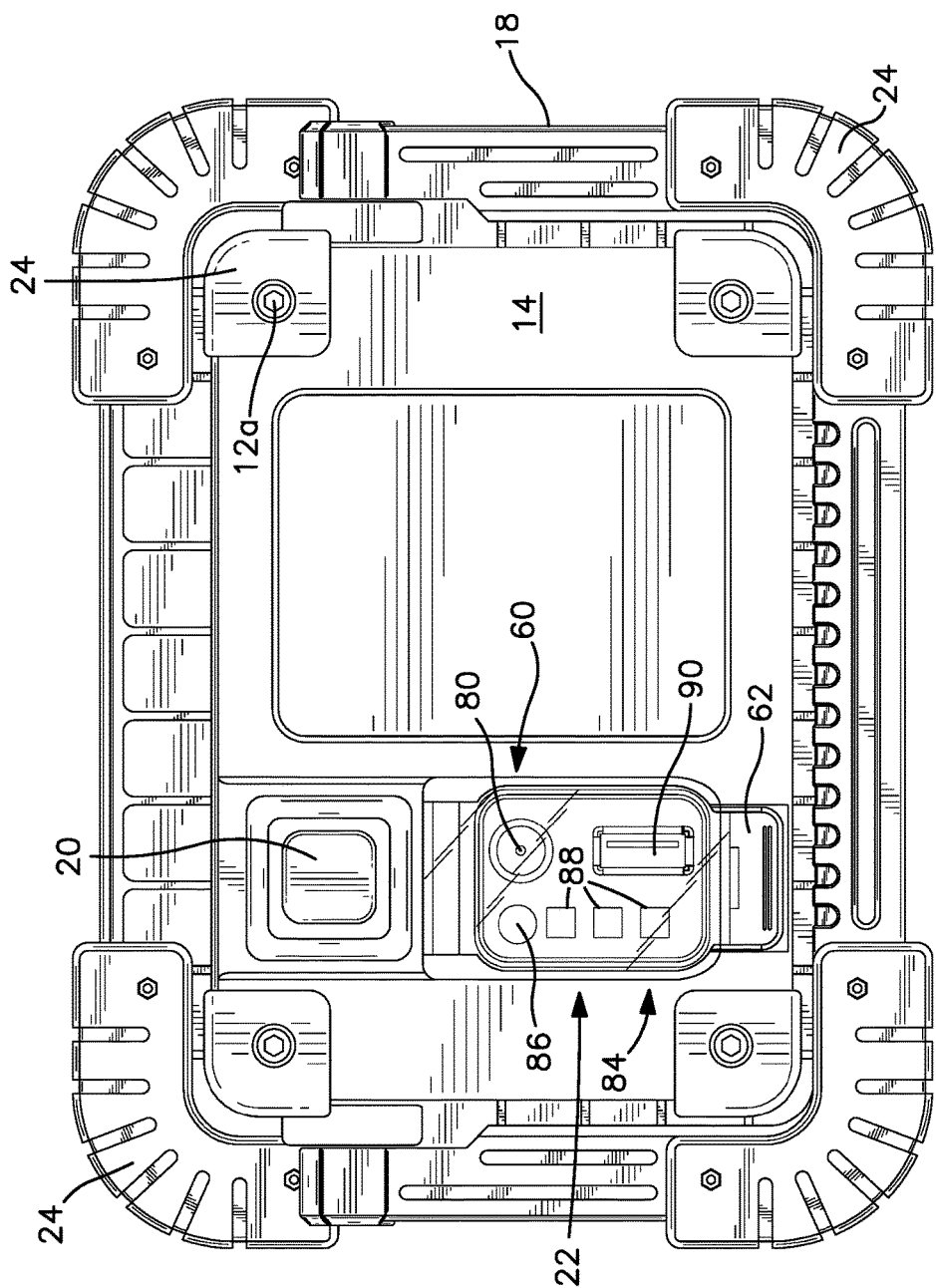
FIG. 3 is a rear view of the light.
Figure 10:
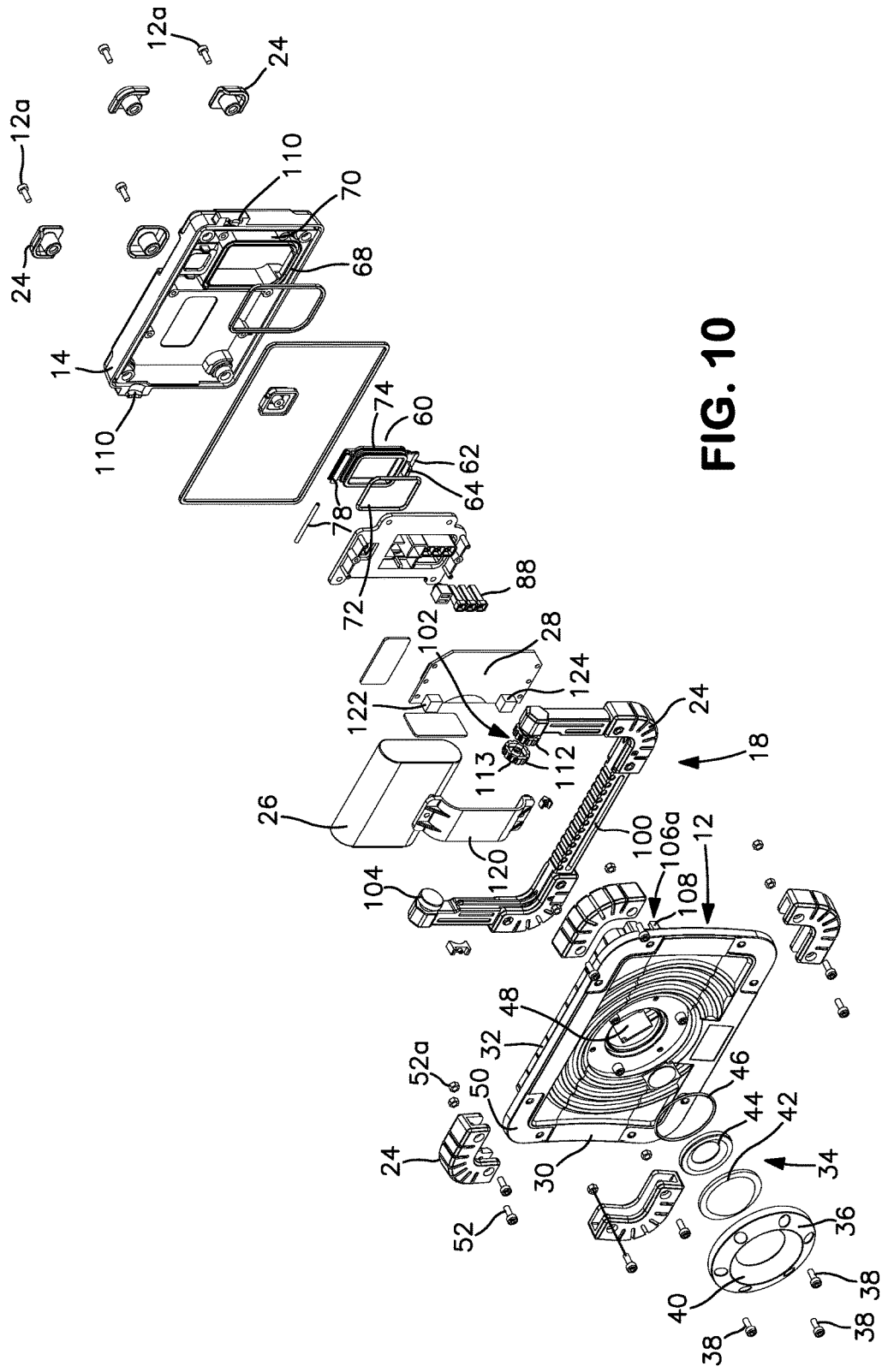
FIG. 10 is an exploded view of one embodiment of the portable light of the invention.

The front cover 12 and back housing 14 enclose various component parts of the portable light and may be attached to each other by suitable fasteners such as allen screws 12a as shown, for example, in FIGS. 3 and 10. The front cover 12 and back housing 14 are preferably made of metal or a molded plastic material. The front cover 12 has a slightly concave panel 30 and a housing 32 which mates with back housing 14. The slightly concave shape as shown, for example, in FIGS. 5 and 8, allows the light to stand better, to focus the illumination of the light and to protect the light source 16 from damage if the portable light is dropped or tipped over. The front housing further includes a plurality of rings 33, primarily for aesthetics.

The front cover 12 includes the light source 16 and a protective housing 34 for the light source 16. Protective housing 34 includes an annular housing 36 made of metal, plastic or similar material connected to the front housing 12 by a plurality of fastening members 38, preferably allen screws. In a preferred embodiment, three fastening members 38 are used and "dummy" fastener members are formed in the three additional recesses 39. The annular housing 36 includes a recess area 40 which decreases in diameter from the outside to the inside of the housing. There is a lens assembly including beveled plastic protective lens 42, an annular beveled ring 44 and O-ring 46, all situated to protect a LED light source 48, preferably a COB LED light source. The beveled lens 42, preferably solid throughout, also provides for direction of the illumination of the light source 48.

The front cover includes bumpers 24 which are secured in recessed portions 50 of the corners of the front cover by fastening members such as allen screws 52 and nuts 52a. The protective bumpers may include grooves 54 for aesthetics and gripping, with the understanding that different bumper configurations may be used and that the bumper may extend around the entire front cover 12. The bumpers 24 are preferably made of rubber or other shock absorbing material. As shown, for example, in FIG. 5, the light source 16 is recessed such that if the light is tipped over, there is no contact of the light source with a contact area. Additionally, the front cover includes a location BN for a brand name.

The back housing 14 provides a protective enclosure for the light source 16, the power source 26, preferably a rechargeable lithium battery, the electrical PLC board 28; and includes the power switch 20 and electrical ports 22. Power switch 20 is preferably made of a plastic material and is water resistant. The power switch may have an on/off setting, preferably four settings; namely a setting for a high 1100 lumen light source; an off setting; a setting for a low 425 lumen light source; and an off setting, i.e. high-off-low-off. It is understood that different high and low lumens may be used for the light source and different settings for the high and low lumens.

Figure 4:
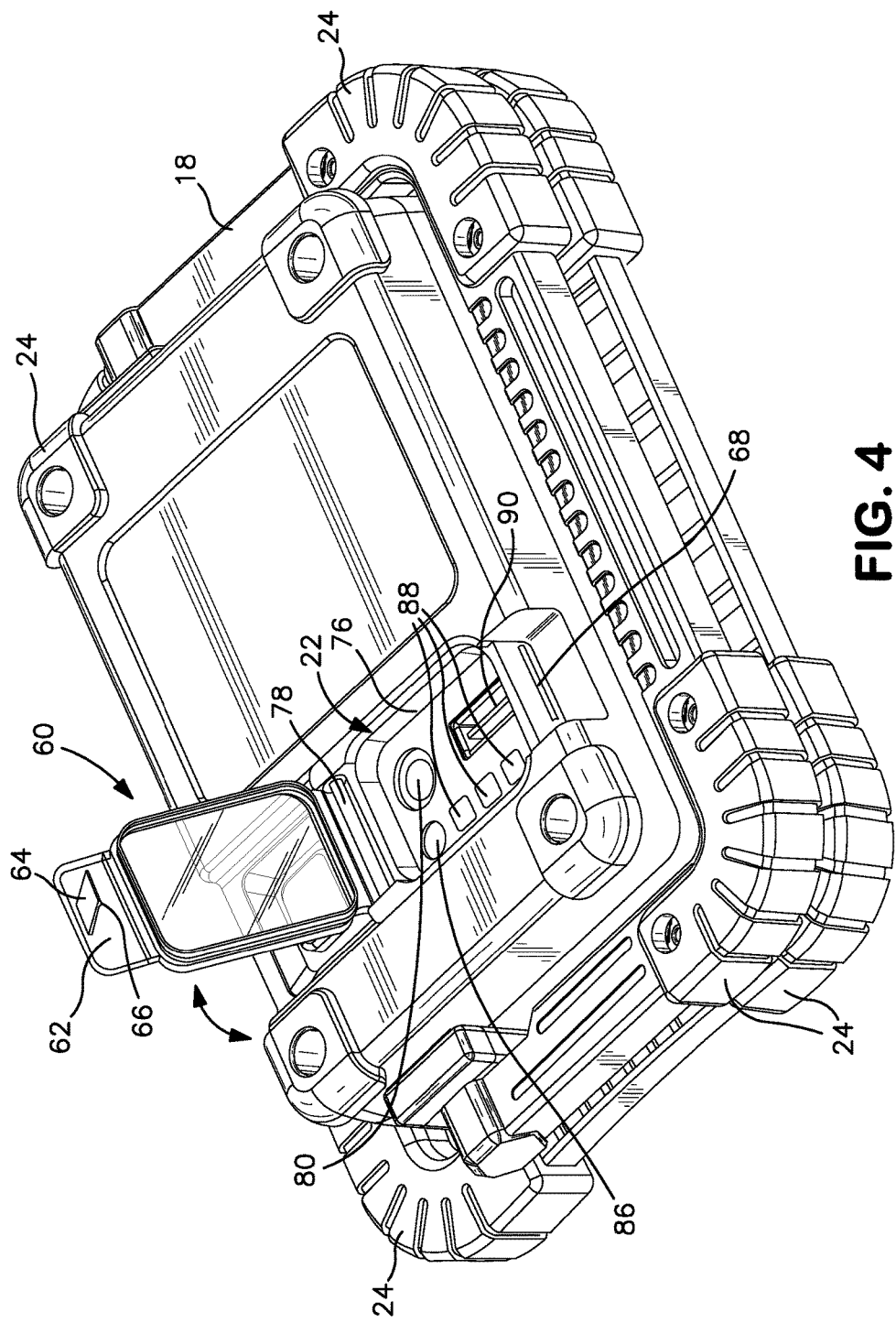
FIG. 4 is a similar view to FIG. 3.

Electrical ports 22 are protected by a protective cover 60, preferably transparent to view the electrical ports and see the battery indicators as discussed below, which provides a protective water resistant seal for ports 22. The protective cover 60 includes a thumb member 62 for opening the housing. The thumb member 62 includes a locking member 64 having a lip 66 for frictionally engaging a groove 68 of electrical port housing 70. There is a rubber gasket 72 in a groove 74 which engages the outer wall 76 to keep the electrical ports 22 secure from the environment, e.g. water or debris, when the protective cover 60 is in a closed position. Protective cover 60 is capable of opening on a hinge 78 180 degrees as seen in FIG. 4. The electrical ports 22 include a charging power input port 80 for charging from a power adaptor 82 having an input jack 83 as shown in FIG. 12. Once the charger is connected, the charging indicator on the adaptor will turn red while charging. When the portable light is fully charged, the adaptor indicator will turn green. The light may also be used under continuous AC power with the power adaptor 82 connected to the light.

As seen in FIGS. 3 and 4, there is a battery charge level indicator 84. This includes a button 86 and three LED lights 88. When the button 86 is pressed, the LED lights below the button will illuminate for a predetermined time period, e.g. three seconds, indicating the battery charge level. For example, illumination of three LED lights 88 may indicate a 70 to 100 percent charge; illumination of two LED lights 88 may indicate a 40 to 69 percent charge; and illumination of one LED light 88 may indicate a 1 to 39 percent charge. When in operation, if the battery charge reaches ten percent or below, the bottom LED light may illuminate red to indicate the low level of the charge.

There is further included a USB output charging port 90. The USB port is compatible with any outbound USB cable. To begin outbound charging, the USB end of a cable is plugged into the port, the other end is then connected into the device, e.g. a telephone, tablet or laptop. The battery charge level indicator button 86 is pressed and held for, e.g. three seconds, to engage the outbound power. When in use, the battery charge level indicator lights will illuminate displaying the amount of charge the light battery has reserved.

Figure 5:
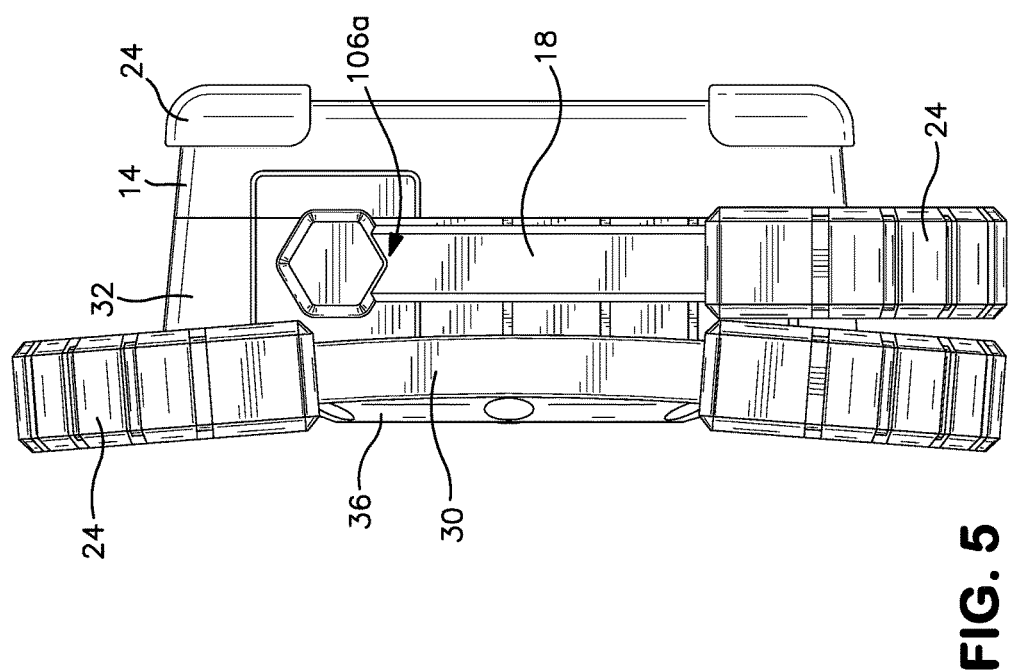
FIG. 5 is a side view of the light.
Figure 8:
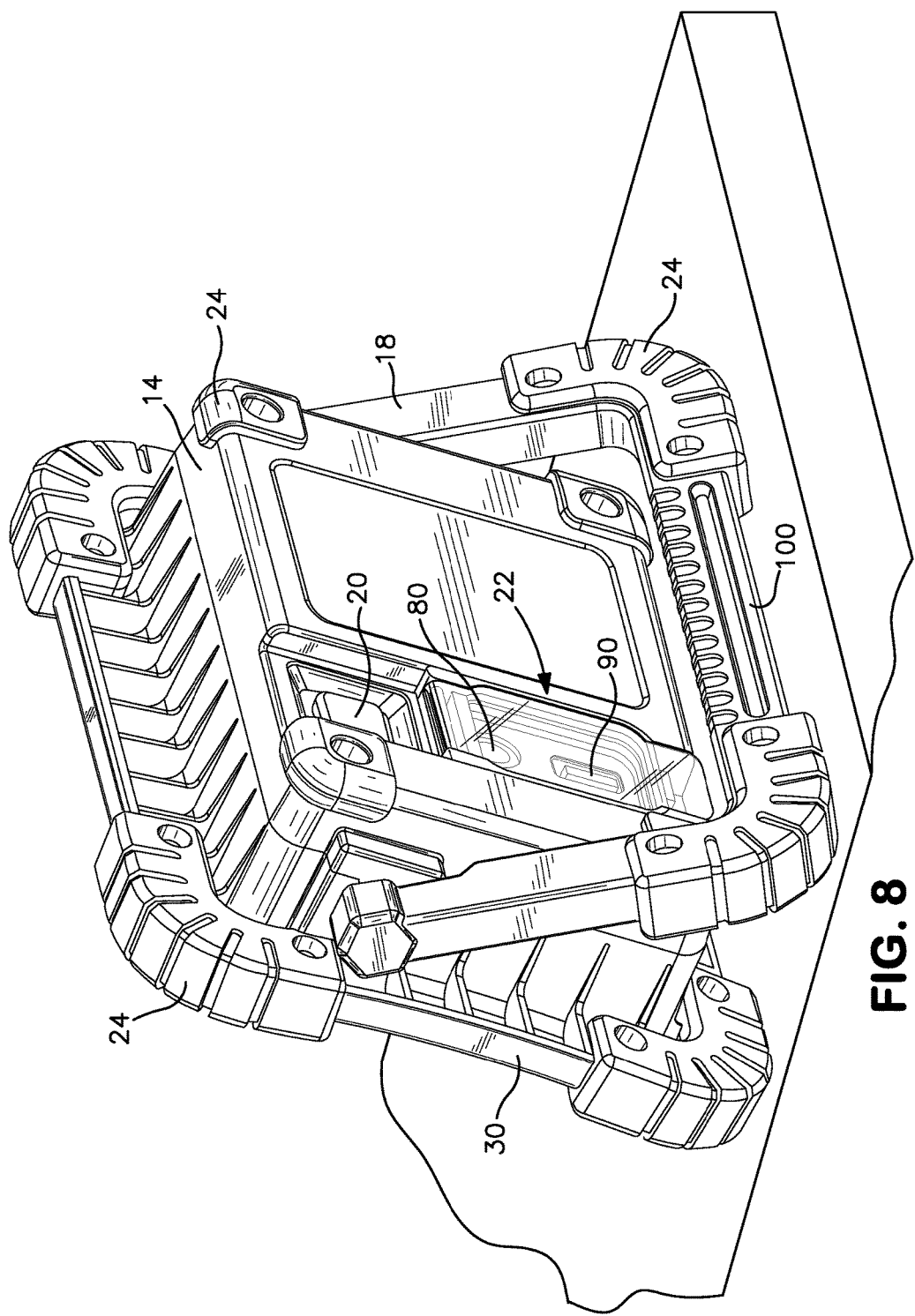
FIG. 8 is a back elevational perspective view of the light showing the ratcheting stand for holding a light in a certain position.
Figure 9:
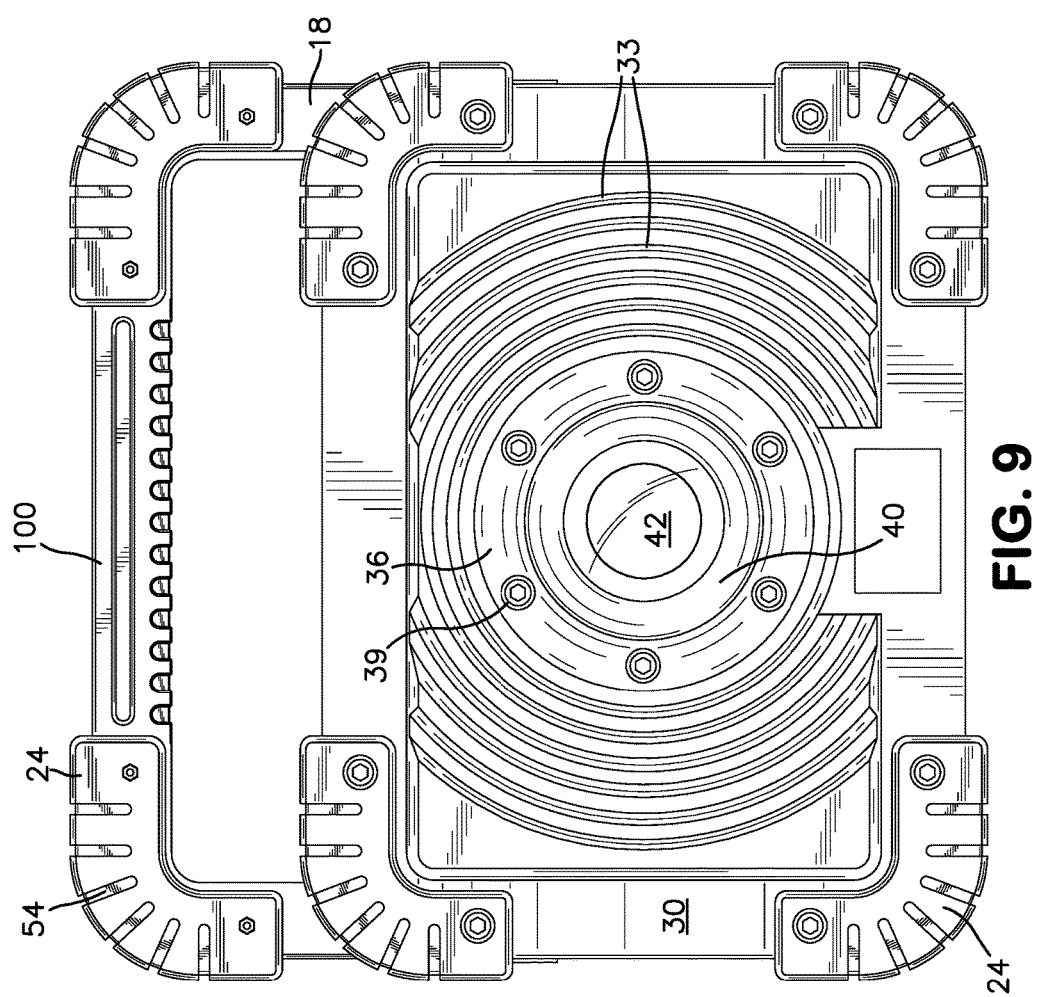
FIG. 9 is a front view of the light showing the ratcheting stand and handle in a carrying position for the light.

Referring now, for example, to FIGS. 5, 8 and 9, the work light includes a ratchet stand and handle 18. The ratchet stand and handle is capable of moving to different positions, e.g. six different positions for providing different stand positions as shown, for example, in FIG. 8. When the work light is not in use, the ratchet stand will be in a closed position as shown for example in FIGS. 1 and 5. When the light is in use, the ratchet stand will be moved to the desired position for positioning the light source on the zone of the work area. As seen, for example, in FIGS. 5 and 9, the ratcheting stand and handle 18 may rotated 180 degrees to carry the portable light or to place the portable light in a hanging position to illuminate the work area (not shown). The ratcheting mechanism is shown in FIG. 10 and includes a handle end 100 having a ratchet end 102 (shown in FIG. 10 both attached to the handle end and exploded from the handle end) and a rotating end 104. Ends 102 and 104 fit into a slots 106 and 106a formed by slot members 108 of front cover 12 and slot member 110 of rear housing 14. Ratchet end 102 includes a gear member 112, preferably having twelve teeth 113, for providing six different positions for the handle 18. There is a spring and ball bearing in slot 106a (formed by 108 and 110) to allow for ratcheting of the handle. As seen, handle 100 includes bumpers 24 attached to the handle by a fastening means such as allen screws. Similarly, back housing 14 includes bumpers 24 attached at each corner of the back housing. As apparent, in a preferred embodiment, no contact point of the portable light is left without a contact point bumper 24 so if the light is dropped, tipped over or is otherwise dislodged, each of the contact points is protected and absorbs any force of the falling portable light. It is understood, however, that a different number of bumpers 24 may be used.

As set forth above, power source 26 is located inside the back housing 14 and is preferably a plurality of rechargeable lithium battery, e.g. three batteries. It is held in place by a bracket 120. Battery 26 is connected to electric PLC board 28 at connection 122 and LED light source 48 is connected to electrical PLC board at connection 124.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by any appended claims.

It is claimed:

1. A portable light comprising
   a front cover having an LED light and having bumpers at least at the corners thereof;
   a back housing;
   a combination ratchet handle and stand connected to said front cover having bumpers at the corners thereof and adapted to allow the portable light to stand by itself and further adapted to rotate 180 degrees to carry the portable light; and
   a protective housing for said LED light comprising an annular housing having a recess area which decreases in diameter from the top of said annular housing to the inside bottom of said annular housing and a lens.

2. The portable light according to claim 1 wherein said front housing is concave.

3. The portable light according to claim 2 wherein said protective housing for said LED light is recessed into said front cover.

4. The portable light according to claim 1 wherein the lens comprises a lens assembly having a beveled lens.

5. The portable light according to claim 1 further comprising battery charge level indicator.

6. The portable light according to claim 5 further comprising a USB port for outbound charging.

7. The portable light according to claim 1 having an on/off switch providing at least two different illuminations.

8. A portable light comprising
   a front housing having an LED light and including bumpers at least at each of the corners of said front housing;
   a back housing having bumpers at least at each of the corners of said back housing; and
   a combination ratchet handle and stand connected to said front housing having bumpers at the corners thereof and further adapted to rotate 180 degrees to carry the portable light.

9. The portable light according to claim 8 further comprising a protective housing for said LED light.

10. The portable light according to claim 9 wherein said protective housing for said LED light is recessed into said front housing.

11. The portable light according to claim 9 wherein said protective housing comprises a housing having a recess area which decreases in diameter from the top of said housing to the inside bottom of said housing and a lens.

12. The portable light according to claim 11 wherein said lens comprises a lens assembly including a beveled lens.

13. The portable light according to claim 8 wherein said front cover is concave.

14. The portable light according to claim 8 further comprising battery charge level indicator.

15. The portable light according to claim 8 further comprising a USB port for outbound charging.

16. The portable light according to claim 8 having an on/off switch providing at least two different illuminations.

17. A portable light comprising a front housing, a back housing and a combination ratchet handle and stand connected to said front housing and adapted to rotate 180 degrees to carry the portable light, wherein said front housing includes an LED light and a protective housing for said LED light comprising an annular housing having a recess area which decreases in diameter from the top of said annular housing to the inside bottom of said annular housing and a lens assembly including a beveled lens.

18. The portable light according to claim 17 wherein said front housing is concave.

19. A portable light according to claim 18 wherein said protective housing for said LED light is recessed into said front cover.

20. A portable light comprising
    a front cover having a COB LED light and having bumpers at least at the corners thereof;
    a back housing having bumpers at least at the corners thereof;
    a combination ratchet handle and stand connected to said front cover and adapted to allow the portable light to stand by itself at different positions and further adapted to rotate 180 degrees to carry the portable light; and
    a protective housing for said COB LED light comprising a housing having an annular recess area which decreases in diameter from the top of said housing to the inside bottom of said housing and a lens assembly including a beveled lens.

21. The portable light according to claim 20 wherein said front cover is concave.

22. The portable light according to claim 21 wherein said protective housing for said LED light is recessed into said front cover.

23. The portable light according to claim 22 further comprising a USB port for outbound charging.

24. The portable light according to claim 23 having an on/off switch providing at least two different illuminations.

25. The portable light according to claim 24 further comprising battery charge level indicator.

26. A portable light comprising
    a front concave housing having a COB LED light and having bumpers at least at the corners thereof;
    a back housing having bumpers at least at the corners thereof;
    said back housing having a USB port for out bound charging and an on/off switch providing at least two different illuminations;
    a combination ratchet handle and stand connected to said front cover and adapted to allow the portable light to stand by itself at different positions and further adapted to rotate 180 degrees to carry the portable light; and
    a protective housing for said COB LED light comprising a housing having an annular recess area which decreases in diameter from the top of said housing to the inside bottom of said housing and a lens assembly including a beveled lens.

27. A portable light comprising
    a front housing having a COB LED light and having bumpers at least at the corners thereof;
    a back housing having bumpers at least at the corners thereof;
    said back housing having an on/off switch providing at least two different illuminations;

a combination ratchet handle and stand connected to said front cover and adapted to allow the portable light to stand by itself at different positions and further adapted to rotate 180 degrees to carry the portable light; and a protective housing for said COB LED light comprising a housing having a recess area which decreases in diameter from the top of said housing to the inside bottom of said housing and a lens assembly.

* * * * *